(12) United States Patent
Sugioka

(10) Patent No.: US 10,535,864 B2
(45) Date of Patent: Jan. 14, 2020

(54) NONAQUEOUS ELECTROLYTE PRIMARY BATTERY AND METHOD FOR PRODUCING SAME

(71) Applicant: HITACHI MAXELL, LTD., Ibaraki-shi, Osaka (JP)

(72) Inventor: Yu Sugioka, Osaka (JP)

(73) Assignee: Maxell Holdings, Ltd., Kyoto (JP)

( * ) Notice: Subject to any disclaimer, the term of this patent is extended or adjusted under 35 U.S.C. 154(b) by 0 days.

(21) Appl. No.: 15/541,610

(22) PCT Filed: Jun. 3, 2016

(86) PCT No.: PCT/JP2016/066548
§ 371 (c)(1),
(2) Date: Jul. 5, 2017

(87) PCT Pub. No.: WO2016/195062
PCT Pub. Date: Dec. 8, 2016

(65) Prior Publication Data
US 2017/0358791 A1   Dec. 14, 2017

(30) Foreign Application Priority Data

Jun. 3, 2015   (JP) .................................. 2015-112750

(51) Int. Cl.
*H01M 4/06* (2006.01)
*H01M 4/38* (2006.01)
*H01M 6/16* (2006.01)

(52) U.S. Cl.
CPC ............. *H01M 4/06* (2013.01); *H01M 4/382* (2013.01); *H01M 6/166* (2013.01); *H01M 6/168* (2013.01); *H01M 2300/0025* (2013.01)

(58) Field of Classification Search
CPC ........ H01M 4/06; H01M 4/382; H01M 6/166; H01M 6/168; H01M 2300/0025
See application file for complete search history.

(56) References Cited

U.S. PATENT DOCUMENTS

| | | | |
|---|---|---|---|
| 4,434,213 A | * | 2/1984 | Niles ....................... H01M 4/13 |
| | | | 429/231.6 |
| 2003/0152839 A1 | | 8/2003 | Kawai et al. |
| | | | (Continued) |

FOREIGN PATENT DOCUMENTS

| | | |
|---|---|---|
| CN | 102280649 A | 12/2011 |
| CN | 102 709 590 A | 10/2012 |
| | (Continued) | |

OTHER PUBLICATIONS

International Search Report dated Aug. 23, 2016, issued in counterpart International Application No. PCT/JP2016/066548 (1 page).
(Continued)

*Primary Examiner* — Brittany L Raymond
(74) *Attorney, Agent, or Firm* — Westerman, Hattori, Daniels & Adrian, LLP

(57) ABSTRACT

A nonaqueous electrolyte primary battery with improved storage properties at high temperatures and excellent reliability, and a method for producing the battery are provided. The nonaqueous electrolyte primary battery includes a negative electrode containing metallic lithium or a lithium alloy, a positive electrode, a separator, and a nonaqueous electrolyte solution. The nonaqueous electrolyte solution contains at least $LiClO_4$ as an electrolyte and 0.1 to 5% by mass of $LiB(C_2O_4)_2$.

8 Claims, 2 Drawing Sheets

(56) References Cited

U.S. PATENT DOCUMENTS

| | | | |
|---|---|---|---|
| 2005/0118507 A1* | 6/2005 | Guterman | H01M 4/134 429/231.95 |
| 2005/0196670 A1* | 9/2005 | Yamaguchi | H01M 4/134 429/200 |
| 2006/0115728 A1 | 6/2006 | Kawai et al. | |
| 2006/0127778 A1 | 6/2006 | Kawai et al. | |
| 2009/0208849 A1 | 8/2009 | Pozin et al. | |
| 2011/0020711 A1* | 1/2011 | Okano | H01M 4/364 429/337 |
| 2011/0117446 A1 | 5/2011 | Lucht et al. | |
| 2014/0106238 A1 | 4/2014 | Giroud et al. | |
| 2014/0295288 A1 | 10/2014 | Ding | |
| 2016/0156070 A1 | 6/2016 | Minami et al. | |

FOREIGN PATENT DOCUMENTS

| | | |
|---|---|---|
| CN | 103 337 660 A | 10/2013 |
| JP | 2004-47413 A | 2/2004 |
| JP | 2006-269173 A | 10/2006 |
| JP | 2007-273438 A | 10/2007 |
| JP | 2009-252681 A | 10/2009 |
| JP | 2011-514628 A | 5/2011 |
| JP | 2015-22985 A | 2/2015 |
| WO | 2015/001717 A1 | 1/2015 |

OTHER PUBLICATIONS

Extended Search Report dated Sep. 14, 2017, issued in counterpart European Application No. 16803493.2 (8 pages).
Office Action dated Sep. 2, 2019, issued in counterpart CN Application No. 201680002963.2, with English translation (12 pages).

* cited by examiner

NONAQUEOUS ELECTROLYTE PRIMARY BATTERY AND METHOD FOR PRODUCING SAME

TECHNICAL FIELD

The present invention relates to a nonaqueous electrolyte primary battery that includes a negative electrode containing metallic lithium or a lithium alloy, and has excellent reliability, and to a method for producing the nonaqueous electrolyte primary battery.

BACKGROUND ART

At present, nonaqueous electrolyte batteries including a nonaqueous electrolyte solution such as a lithium primary battery and a lithium ion secondary battery are used in various fields. For example, the nonaqueous electrolyte batteries are used as power sources of portable devices, or find applications where the batteries are exposed to high temperatures and strong vibrations, including the use of the batteries as power sources of pressure sensors located inside tires. With the widespread use of the nonaqueous electrolyte batteries, many attempts have been made to improve their various properties.

A nonaqueous electrolyte battery that uses metallic lithium or a lithium alloy such as a lithium-aluminum alloy as a negative electrode active material, particularly a coin-type lithium primary battery, generally includes a nonaqueous electrolyte solution containing $LiClO_4$ as an electrolyte, which has a high ionic conductivity and can provide excellent discharge characteristics. However, when the battery is stored at high temperatures, a reaction between the electrolyte solution and the electrodes can occur, leading to expansion of the battery. Therefore, in the applications where the battery is used in the high temperature environment, measures need to be taken to suppress the reaction between the electrolyte solution and the electrodes.

To deal with this issue, a sulfur compound such as propane sultone has been known as an additive that forms a coating on the surface of the positive electrode or the negative electrode so as not to react with the electrolyte solution, and thus can suppress expansion of the battery during the high temperature storage (see Patent Document 1).

However, if the electrolyte solution contains at least a certain amount of the above compound to obtain a sufficient effect of suppressing the expansion of the battery, the coating formed on the surface of the electrode interferes with the discharge reaction and increases the internal resistance of the battery. Consequently, the discharge characteristics are likely to be reduced after the high temperature storage.

On the other hand. Patent Document 2 discloses a battery that includes a nonaqueous electrolyte solution containing lithium bis(oxalato)borate $[LiB(C_2O_4)_2]$ and $LiBF_4$ at a molar ratio of 2:8 to 5:5. The use of this nonaqueous electrolyte solution prevents an increase in the internal resistance due to liberation of water from a positive electrode active material into the electrolyte solution at high temperatures, or an increase in the internal pressure due to decomposition of the electrolyte solution. Thus, the battery can have excellent properties both at low temperatures and at high temperatures.

$LiBF_4$ is an electrolyte salt having relatively high heat resistance. When the nonaqueous electrolyte solution contains $LiBF_4$ in combination with $LiB(C_2O_4)_2$, the battery can have excellent storage properties up to a temperature of about 100° C. However, in the environment at higher temperatures, even if the nonaqueous electrolyte solution contains $LiB(C_2O_4)_2$, the properties of the battery are likely to be reduced by the reaction with water.

Therefore, further studies are required to prevent the degradation of the properties when the battery is stored under severe conditions at higher temperatures, e.g., in a high temperature environment of 110° C. or more.

PRIOR ART DOCUMENTS

Patent Documents

Patent Document 1: JP2004-47413A
Patent Document 2: JP 2006-269173A

DISCLOSURE OF INVENTION

Problem to be Solved by the Invention

With the foregoing in mind, it is an object of the present invention to provide a nonaqueous electrolyte primary battery that includes a negative electrode containing metallic lithium or a lithium alloy, and that has improved storage properties at high temperatures and excellent reliability, and also to provide a method for producing the nonaqueous electrolyte primary battery.

Means for Solving Problem

A nonaqueous electrolyte primary battery of the present invention, which is able to achieve the above object, includes a negative electrode containing metallic lithium or a lithium alloy, a positive electrode, a separator and a nonaqueous electrolyte solution. The nonaqueous electrolyte solution contains at least $LiClO_4$ as an electrolyte and 0.1 to 5% by mass of $LiB(C_2O_4)_2$.

A method for producing a nonaqueous electrolyte primary battery of the present invention includes placing a negative electrode containing metallic lithium or a lithium alloy, a positive electrode, a separator, and a nonaqueous electrolyte solution inside an outer package. The nonaqueous electrolyte solution contains at least $LiClO_4$ as an electrolyte and 0.1 to 5% by mass of $LiB(C_2O_4)_2$.

Effects of the Invention

The present invention can provide a nonaqueous electrolyte primary battery with excellent reliability and a method for producing the battery by suppressing expansion of the battery and an increase in the internal resistance during the high temperature storage.

DESCRIPTION OF THE INVENTION

Figure 1:
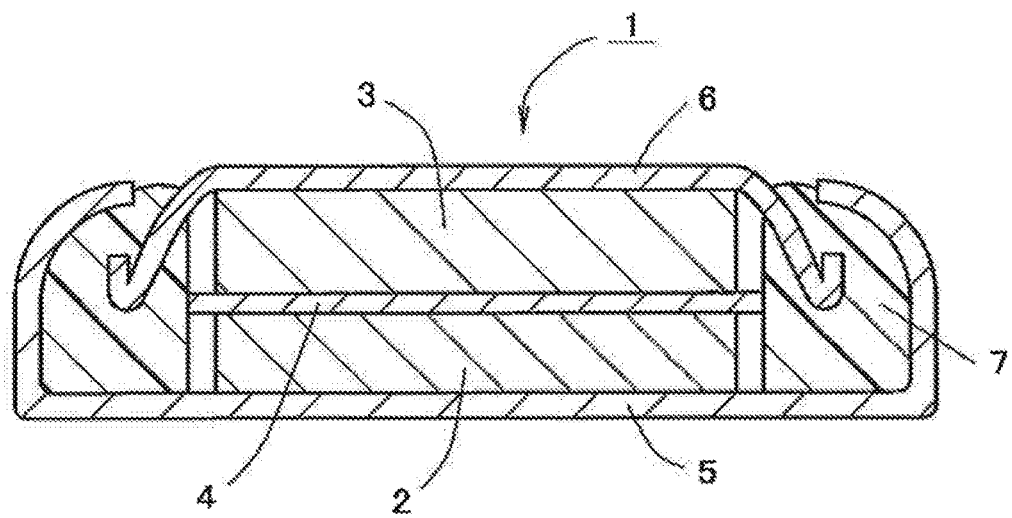
FIG. 1 is a vertical cross-sectional view schematically illustrating an example of a nonaqueous electrolyte primary battery of the present invention.

A nonaqueous electrolyte primary battery of the present invention uses a nonaqueous electrolyte solution that contains at least $LiClO_4$ as an electrolyte and 0.1 to 5% by mass of $LiB(C_2O_4)_2$.

When metallic lithium or a lithium alloy of a negative electrode of the present invention comes into contact with the nonaqueous electrolyte solution containing $LiB(C_2O_4)_2$, a protective coating is formed on the surface of the negative electrode to suppress the reaction between the electrolyte solution and the surface of the negative electrode. This protective coating effectively acts even in a high temperature environment of 110° C. or more, and can prevent the reaction of the negative electrode with water or the like that has been introduced into the battery during assembly of the battery. Moreover since the nonaqueous electrolyte solution contains $LiClO_4$ as an electrolyte, the battery can maintain excellent properties even in a high temperature environment, and is less likely to expand due to gas generation. Additionally, an increase in the internal resistance, caused by the formation of an oxide or a hydroxide of lithium that does not contribute to discharge, is suppressed. Thus, the nonaqueous electrolyte primary battery can have excellent reliability even in a high temperature environment.

When a lithium alloy is used as a negative electrode active material, in general, an alloying element (e.g., aluminum) for forming a lithium alloy is allowed to react with lithium inside the battery, so that the lithium alloy is formed. In this case, the alloying element is typically in the form of particles or a film. The alloying element becomes greater in volume and then is transformed into a fine powder while it is alloyed with lithium. Therefore, the active electrode material is easily desorbed from the negative electrode, e.g., due to the influence of vibration, which may result in a short circuit or the like.

However, the nonaqueous electrolyte primary battery of the present invention uses the nonaqueous electrolyte solution containing 0.1 to 5% by mass of $LiB(C_2O_4)_2$ to form a protective coating on the surface of the negative electrode. The protective coating serves to suppress the electrochemical reaction between the lithium and the alloying element, and thus to reduce the generation of a large amount of fine powder caused by the formation of a lithium alloy. Therefore, the nonaqueous electrolyte primary battery is expected to be able to prevent a short circuit or the like that may occur due to desorption of the fine powder of the lithium alloy from the negative electrode.

Accordingly, even if the nonaqueous electrolyte primary battery uses a separator that has a relatively large pore size and allows the active material fine powder desorbed from the electrode to easily pass through the pores, such as a nonwoven fabric separator, the nonaqueous electrolyte primary battery can minimize a short circuit due to the finely powdered negative electrode active material, and improve the vibration resistance.

The nonaqueous electrolyte solution of the nonaqueous electrolyte primary battery of the present invention may include an organic solvent and an electrolyte that is dissolved in the organic solvent. Examples of the organic solvent include the following: cyclic carbonates such as ethylene carbonate, propylene carbonate (PC), butylene carbonate, and vinylene carbonate; chain carbonates such as dimethyl carbonate, diethyl carbonate, and methyl ethyl carbonate; ethers such as 1,2-dimethoxyethane (DME), Diglyme (diethylene glycol dimethyl ether), Triglyme (triethylene glycol dimethyl ether), Tetraglyme (tetraethylene glycol dimethyl ether), methoxyethoxyethane, 1,2-diethoxyethane, and tetrahydrofuran; cyclic ester such as γ-butyrolactone; and nitrile. These may be used alone or in combination of two or more. In particular, any combination of the carbonates and the ethers is preferred.

When the carbonate and the ether are combined as a solvent of the nonaqueous electrolyte solution, a quantitative ratio (mixing ratio) of the carbonate to the ether (carbonate:ether) in the total solvent is preferably 30:70 to 70.30, which is expressed as a volume ratio.

The nitrile is also preferred as a solvent of the nonaqueous electrolyte solution. The nitrile has both a low viscosity and a high dielectric constant. Therefore, the use of the nitrile as a solvent of the nonaqueous electrolyte solution can further improve the load characteristics of the nonaqueous electrolyte primary battery.

Specific examples of the nitrile include the following: mononitriles such as acetonitrile, propionitrile, butyronitrile, valeronitrile, benzonitrile, and acrylonitrile; dinitriles such as malononitrile, succinonitrile, glutaronitrile, adiponitrile, 1,4-dicyanoheptane, 1,5-dicyanopentane, 1,6-dicyanohexane, 1,7-dicyanoheptane, 2,6-dicyanoheptane, 1,8-dicyanooctane, 2,7-dicyanooctane, 1,9-dicyanononane, 2,8-dicyanononane, 1,10-dicyanodecane, 1,6-dicyanodecane, and 2,4-dimethylglutaronitrile; cyclic nitrile such as benzonitrile; and alkoxy-substituted nitrile such as methoxyacetonitrile. Among these, acetonitrile is particularly preferred.

When the nitrile is used as a solvent of the nonaqueous electrolyte solution, the content of the nitrile in the total amount of the solvent of the nonaqueous electrolyte solution is preferably 5% by volume or more, and more preferably 8% by volume or more in terms of favorably ensuring the effect of using the nitrile. However, since the nitrile is highly reactive with the lithium of the negative electrode, it is preferable that the amount of the nitrile used is limited to the extent that an excessive reaction between them is suppressed. Thus, the content of the nitrile in the total amount of the solvent of the nonaqueous electrolyte solution is preferably 20% by volume or less, and more preferably 17% by volume or less.

The electrolyte dissolved in the nonaqueous electrolyte solution is $LiClO_4$ and the concentration of $LiClO_4$ in the nonaqueous electrolyte solution is preferably 0.3 mol/l or more, and more preferably 0.4 mol/l or more. The concentration of $LiClO_4$ is preferably 1 mol/l or less, more preferably 0.8 mol/l or less, and particularly preferably 0.7 mol/l or less.

If necessary, the nonaqueous electrolyte solution may contain an electrolyte other than $LiClO_4$ in combination with $LiClO_4$. Examples of the electrolyte that can be combined with $LiClO_4$ include the following: $LiBF_4$, $LiPF_6$, $LiAsF_6$, $LiSbF_6$, $LiC_nF_{2n+1}SO_3$ (n≥1) [$LiCF_3SO_3$, $LiC_4F_9SO_3$, etc.], lithium imide salts [$LiN(FSO_2)_2$, $LiN(CF_3SO_2)_2$, $LiN(C_2F_5SO_2)_2$, etc.], $LiC(CF_3SO_2)_3$, $LiCFCO_2$, $LiB_{10}Cl_{10}$, lower aliphatic lithium carboxylate, $LAlCl_4$, LiCl, LiBr, LiI, chloroborane lithium, and lithium tetraphenylborate.

When the electrolyte other than $LiClO_4$ is combined with $LiClO_4$, the sum of the concentration of the electrolyte other than $LiClO_4$ and that of $LiClO_4$ in the nonaqueous electrolyte solution is preferably adjusted to 1 mol/l or less, and more preferably 0.8 mol/l or less so as not to interfere with the properties of $LiClO_4$.

Moreover, in terms of favorably ensuring the effect of improving the reliability of the battery in the high temperature environment due to the combination of $LiB(C_2O_4)_2$ with $LiClO_4$, the content of $LiB(C_2O_4)_2$ in the nonaqueous electrolyte solution of the battery may be 0.1% by mass or more, preferably 0.3% by mass or more, more preferably 0.5% by mass or more, and particularly preferably 1% by mass or more. However, if the content of LiB($C_2O_4$)$_2$ in the nonaqueous electrolyte solution of the battery is too large, the coating that is derived from LiB($C_2O_4$)$_2$ and formed on the surface of the negative electrode becomes thicker, which may increase the internal resistance and reduce the discharge characteristics of the battery. Therefore, in order to suppress an increase in the internal resistance of the battery for such a reason, the content of LiB($C_2O_4$)$_2$ in the nonaqueous electrolyte solution of the battery may be 5% by mass or less, preferably 3% by mass or less, more preferably 2% by mass or less, and particularly preferably 1.5% by mass or less.

To make it easier to achieve the above effect, in particular, the proportion between LiClO$_4$ and LiB($C_2O_4$)$_2$ is preferably within a predetermined range. The proportion of LiB($C_2O_4$)$_2$ in the total amount of LiClO$_4$ and LiB($C_2O_4$)$_2$ is preferably 3 mol % or more, more preferably 5 mol % or more and is preferably 20 mol % or less, more preferably 18 mol % or less.

If necessary the nonaqueous electrolyte solution may also contain an additive other than LiB($C_2O_4$)$_2$. Examples of the additive that can be combined with LiB($C_2O_4$)$_2$ include the following: saturated cyclic sultone compounds such as 1,3-propanesultone and 1,4-butanesultone; unsaturated cyclic sultone compounds such as 1,3-propenesultone; acid anhydrides such as maleic anhydride and phthalic anhydride; and dinitriles such as succinanitrile, glutaronitrile, and adiponitrile.

In view of, e.g., the solubility in the electrolyte solution, the saturated cyclic sultone compounds and the unsaturated cyclic sultone compounds are preferably five- to seven-membered ring compounds, and more preferably compounds with a five-membered ring structure.

When the additive is combined with LiB($C_2O_4$)$_2$, the sum of the content of the additive and that of LiB($C_2O_4$)$_2$ in the nonaqueous electrolyte solution is preferably 5% by mass or less, and more preferably 3% by mass or less so as not to interfere with the above effect of the combination of LiCiO$_4$ and LiB($C_2O_4$)$_2$.

The nonaqueous electrolyte solution may be gelled by the addition of a known gelling agent (i.e., a gel-like electrolyte can also be used).

The negative electrode of the nonaqueous electrolyte primary battery of the present invention contains metallic lithium or a lithium alloy. As the negative electrode containing metallic lithium, a metallic lithium foil may be either directly used or pressure-banded to one side or both sides of a current collector.

As the negative electrode containing a lithium alloy, a lithium alloy foil may be either directly used or pressure-bonded to one side or both sides of a current collector.

Another possible method for forming the negative electrode containing a lithium alloy is as follows. A layer containing an alloying element for firming a lithium alloy may be laminated on, e.g., pressure-bonded to the surface of a lithium layer (lithium-containing layer) composed of a metallic lithium foil or the like. This laminated body may be brought into contact with the nonaqueous electrolyte solution inside the battery, so that the lithium alloy is formed on the surface of the lithium layer, thus providing a negative electrode. In this negative electrode, the laminated body may have the layer containing the alloying element only one side of the lithium layer or both sides of the lithium layer. The laminated body can be formed, e.g., by pressure-bonding the metallic lithium foil and the fail composed of the alloying element together.

The current collector may also be used when a lithium alloy is formed as a negative electrode in the battery. For example, a laminated body may be configured such that the lithium layer is provided on one side of a negative electrode current collector, and the layer containing the alloying element is provided on the opposite side of the lithium layer from the negative electrode current collector. Alternatively, a laminated body may be configured such that the lithium layer is provided on both sides of the negative electrode current collector, and the layer containing the alloying element is provided on the opposite side of each of the lithium layers from the negative electrode current collector. The negative electrode current collector and the lithium layer (metallic lithium foil) may be laminated, e.g., by pressure-bonding.

Examples of the alloying element for forming a lithium alloy include aluminum, lead, bismuth, indium, and gallium. Among these, aluminum is preferred.

The layer containing the alloying element of the laminated body for a negative electrode may be, e.g., a foil composed of any of the above alloying elements. The thickness of the layer containing the alloying element is preferably 1 μm or more, more preferably 3 μm or more and is preferably 20 μm or less, more preferably 12 μm or less.

The lithium layer of the laminated body for a negative electrode may be, e.g., a metallic lithium foil. The thickness of the lithium layer is preferably 0.1 to 1.5 mm. It is also preferable that the lithium layer (metallic lithium foil) used to form the negative electrode containing metallic lithium has a thickness of 0.1 to 1.5 mm.

The negative electrode current collector may be made of copper, nickel, iron, or stainless steel, and may be in the form of e.g., a plain-woven wire mesh, an expanded metal, a lath mesh, a punching metal, a metal foam, or a foil (plate). The thickness of the negative electrode current collector is preferably, e.g., 5 to 100 μm. It is also desirable that a paste-like conductive material such as a carbon paste or a silver paste be applied to the surface of the current collector.

The positive electrode of the nonaqueous electrolyte primary battery of the present invention may be a molded body obtained by forming a mixture (i.e., a positive electrode mixture) including, e.g., a positive electrode active material, a conductive assistant, and a binder into a pellet or the like. The positive electrode may also have a structure in which a layer composed of the positive electrode mixture (i.e., a positive electrode mixture layer) is provided on one side or both sides of the current collector.

Examples of the positive electrode active material include the following: lithium-containing composite oxides such as manganese dioxide, Li$_x$Mn$_3$O$_6$ (0<x<2), Li$_x$MnO$_2$ (0<x<1), and Li$_x$Ti$_{5/3}$O$_4$ (4/3≤x<7/3); a vanadium oxide; a niobium oxide; a titanium oxide; sulfides such as iron disulfide; and graphite fluoride.

Examples of the conductive assistant of the positive electrode mixture include the following: scaly graphite; acetylene black; Ketjen black; and carbon black. These may be used alone or in combination of two or more.

Examples of the binder of the positive electrode mixture include fluorocarbon polymers such as polyvinylidene fluoride (PVDF), polytetrafluoroethylene (PTFE), and a propylene hexafluoride polymer. These may be used alone or in combination of two or more.

When the positive electrode is a molded body of a positive electrode mixture, it can be produced in the following manner. For example, the positive electrode mixture is prepared by mixing, e.g., the positive electrode active material, the conductive assistant, and the binder, and then is pressure-molded into a predetermined shape.

When the positive electrode includes a positive electrode mixture layer and a current collector it can be produced in the following manner. For example, a composition (slurry or paste) containing a positive electrode mixture is prepared by dispersing, e.g., the positive electrode active material, the conductive assistant, and the binder in water or an organic solvent such as N-methyl-2-pyrrolidone (NMP) (where the binder may be dissolved in the solvent). Then, the composition is applied to the current collector and dried and optionally pressed by calendering or the like.

However, the production method of the positive electrode is not limited to the above, and the positive electrode may be produced by other methods.

The composition of the positive electrode mixture of the positive electrode may be defined so that the amount of the positive electrode active material is preferably 80 to 90% by mass, the content of the conductive assistant is preferably 1.5 to 10% by mass, and the content of the binder is preferably 0.3 to 10% by mass.

The thickness of the molded body of the positive electrode mixture is preferably 0.15 to 4 mm. On the other hand, when the positive electrode includes the positive electrode mixture layer and the current collector, the thickness of the positive electrode mixture layer (per one side of the current collector) is preferably 30 to 300 µm.

The current collector used in the positive electrode may be made of, e.g., stainless steel such as SUS316, SUS430, or SUS444, and may be in the form of e.g., a plain-woven wire mesh, an expanded metal, a lath mesh, a punching metal, a metal foam, or a foil (plate). The thickness of the current collector is preferably e.g., 0.05 to 0.2 mm. It is also desirable that a paste-like conductive material such as a carbon paste or a silver paste be applied to the surface of the current collector.

When the nonaqueous electrolyte primary battery of the present invention includes the negative electrode (or the laminated body for the negative electrode) having the current collector and the positive electrode having the current collector, the negative electrode and the positive electrode may be laminated via a separator to form a laminated body (laminated electrode body). Moreover, this laminated body may be spirally wound to form a wound body (wound electrode body). Further this wound body may be shaped into a flat wound body with a flat cross section (flat wound electrode body). When the nonaqueous electrolyte primary battery includes the positive electrode that is the molded body of the positive electrode mixture and the negative electrode (or the laminated body for the negative electrode) that does not have a current collector, the positive electrode and the negative electrode may be housed in a flat battery case while a separator is interposed between the electrodes.

The separator may be, e.g., a nonwoven fabric or a fine porous membrane (fine porous film) made of polyolefin such as polyethylene (PE), polypropylene (PP), or an ethylene-propylene copolymer. Moreover, when heat resistance is required in relation to the intended use of the battery, the nonwoven fabric or the fine porous membrane may also be made of e.g., a fluorocarbon polymer such as a tetrafluoroethylene-perfluoroalkoxyethylene copolymer (PFA), polyphenylene sulfide (PPS), polyether ether ketone (PEEK), polybutylene terephthalate (PBT), polymethylpentene, polyamide, polyimide, aramid, or cellulose. These materials of the nonwoven fabric or the fine porous membrane may be used alone or in combination of two or more. The separator may have a single layer structure of the nonwoven fabric or the fine porous membrane made of any of the above materials. Alternatively, the separator may also have a laminated structure of a plurality of nonwoven fabrics or fine porous membranes made of, e.g., different materials.

The thickness of the separator may be, e.g., 500 µm or less, preferably 450 µm or less, and more preferably 300 µm or less in terms of suppressing a reduction in the energy density of the battery. However, if the separator is too thin, its function of preventing a short circuit can be reduced. Therefore, when the separator is a nonwoven fabric, the thickness may be, e.g., 30 µm or more, preferably 100 µm or more, and more preferably 150 µm or more. When the separator is a fine porous membrane, the thickness is preferably 10 µm or more, and more preferably 15 µm or more.

The form of the nonaqueous electrolyte primary battery of the present invention is not particularly limited, and the battery may be in various forms such as a flat battery (including a coin-type battery and a button-type battery), a laminated-type battery, and a barrel-type battery (including a cylindrical battery and a rectangular (prismatic) battery). As an outer package (battery case) for housing the negative electrode, the positive electrode, the separator, and the nonaqueous electrolyte solution, a metal can (outer can) having an opening may be used in combination with a cover (sealing plate), or a metallic laminated film may be used.

Specifically, the outer can and the sealing plate may be joined by caulking via a gasket or may be welded to seal the joint between them. In this manner, a flat battery or a barrel-type battery can be produced. Alternatively, two metallic laminated films are layered or one metallic laminated film is bent, and then sealed by bonding their borders. In this manner, a laminated-type battery can be produced.

When the outer package is sealed by caulking, the gasket arranged between the outer can and the sealing plate may be made of e.g., PP or nylon. Moreover, when heat resistance is required in relation to the intended use of the battery the gasket may also be made of heat-resistant resin with a melting point of more than 240° C. such as a fluorocarbon polymer (e.g., PFA), polyphenylene ether (PEE), polysulfone (PSF), polyalylate (PAR), polyether sulfone (PES), PPS, or PEEK. Further, when the intended use of the battery requires heat resistance, the outer package may be sealed by a glass hermetic seal.

EXAMPLES

Hereinafter, the present invention will be described in detail by way of examples. However, the present invention is not limited to the following examples.

Example 1

<Production of Positive Electrode>
A positive electrode mixture was prepared by mixing manganese dioxide (a positive electrode active material), carbon black (a conductive assistant), and PTFE (a binder) at a mass ratio of 93:3.4. Then, the positive electrode mixture was formed into a positive electrode (positive electrode mixture molded body) with a diameter of 16 mm and a thickness of 1.8 mm.

<Production of Laminated Body for Negative Electrode>
An aluminum foil with a thickness of 0.01 µm was pressure-bonded to one side of a lithium foil with a thickness of 0.6 mm. This was then punched into a circle with a diameter of 16 mm, thus providing a laminated body for a negative electrode.

<Preparation of Nonaqueous Electrolyte Solution>

PC and DME were mixed at a volume ratio of 1:1. Then, $LiClO_4$ was dissolved in this mixed solvent at a concentration of 0.5 mol/l, and 1% by mass of $LiB(C_2O_4)_2$ was further added, so that a nonaqueous electrolyte solution was prepared. The proportion of $LiB(C_2O_4)_2$ in the total amount of $LiClO_4$ and $LiB(C_2O_4)_2$ was 10 mol %.

<Assembly of Battery>

Using a PPS nonwoven fabric (with a thickness of 170 μm) as a separator, along with the positive electrode, the laminated body for the negative electrode, and the nonaqueous electrolyte solution thus produced, a nonaqueous electrolyte primary battery with a diameter of 20 mm and a height of 3.2 mm was assembled to have a structure as illustrated in FIG. 1.

FIG. 1 is a vertical cross-sectional view schematically illustrating the nonaqueous electrolyte primary battery of Example 1. In the nonaqueous electrolyte primary battery 1 of Example 1, the positive electrode 2 was housed in an outer can 5 made of stainless steel, and the negative electrode 3 was placed on the positive electrode 2 via the separator 4. The negative electrode 3 was pressure-bonded to the inner surface of a sealing plate 6 so that the lithium layer (lithium foil) was in contact with the sealing plate 6. A lithium-aluminum alloy (not illustrated in FIG. 1) was formed on the surface of the negative electrode 3 facing the separator 4. Moreover, the nonaqueous electrolyte solution (not illustrated) was injected into the battery 1.

In the nonaqueous electrolyte primary battery 1, the outer can 5 also served as a positive electrode terminal, and the sealing plate 6 also served as a negative electrode terminal. The sealing plate 6 was fitted into the opening of the outer can 5 via an insulating gasket 7 made of PPS, and the opening edge of the outer can 5 was tightened inward, which brought the insulting gasket 7 into contact with the sealing plate 6. Thus, the opening of the outer can 5 was sealed to form a closed structure in the battery. In other words, a closed battery case of the nonaqueous electrolyte primary battery 1 was formed of the outer can 5, the sealing plate 6, and the insulating gasket 7 arranged between the outer can 5 and the sealing plate 6, and the electrode body in which the positive electrode 2, the separator 4, and the negative electrode 3 were laminated, and the nonaqueous electrolyte solution were placed inside the battery case.

Example 2

A nonaqueous electrolyte solution was prepared in the same manner as Example 1 except that $LiB(C_2O_4)_2$ was added in an amount of 5% by mass. Then, a nonaqueous electrolyte primary battery was produced in the same manner as Example 1 except that this nonaqueous electrolyte solution was used. The proportion of $LiB(C_2O_4)_2$ in the total amount of $LiClO_4$ and $LiB(C_2O_4)_2$ was 36 mol %.

Comparative Example 1

A nonaqueous electrolyte solution was prepared in the same manner as Example 1 except that 1,3-propanesultone (PS) was added in an amount of 2% by mass instead of $LiB(C_2O_4)_2$. Then, a nonaqueous electrolyte primary battery was produced in the same manner as Example 1 except that this nonaqueous electrolyte solution was used.

<Evaluation of Reliability in High Temperature Environment>

A resistance of 15 kΩ was connected to each of the nonaqueous electrolyte primary batteries of Example 1, Example 2, and Comparative Example 1, and the batteries were discharged until the depth of discharge was 60% of the positive electrode capacity. After the discharge, the batteries were placed in a thermostatic bath at 120° C., and the height of each battery was measured at the time intervals shown in Table 1. Then, the amount of change in the heights of the batteries (i.e., the amount of expansion of the batteries) from the height (3.2 mm) immediately after the production of the batteries were determined.

<Evaluation of Properties of Battery after High Temperature Storage>

The properties of the nonaqueous electrolyte primary batteries of Example 1, Example 2, and Comparative Example 1 after the high temperature storage were evaluated under the following conditions when the depth of discharge was 60%.

An initial internal resistance and an open circuit voltage (OCV) of each of the batteries of Example 1, Example 2, and Comparative Example 1 were measured in an environment of 20° C. Next, each of the batteries after the measurement was connected to a resistance of 15 kΩ and discharged 60% of the design capacity. Moreover, the batteries with a depth of discharge of 60% were placed and maintained in a thermostatic bath at 120° C. After 323 hours had passed, the batteries were taken out and allowed to cool. Then, the internal resistance and the open circuit voltage (OCV) of each of the batteries after the high temperature storage were measured in an environment of 20° C.

Figure 2:
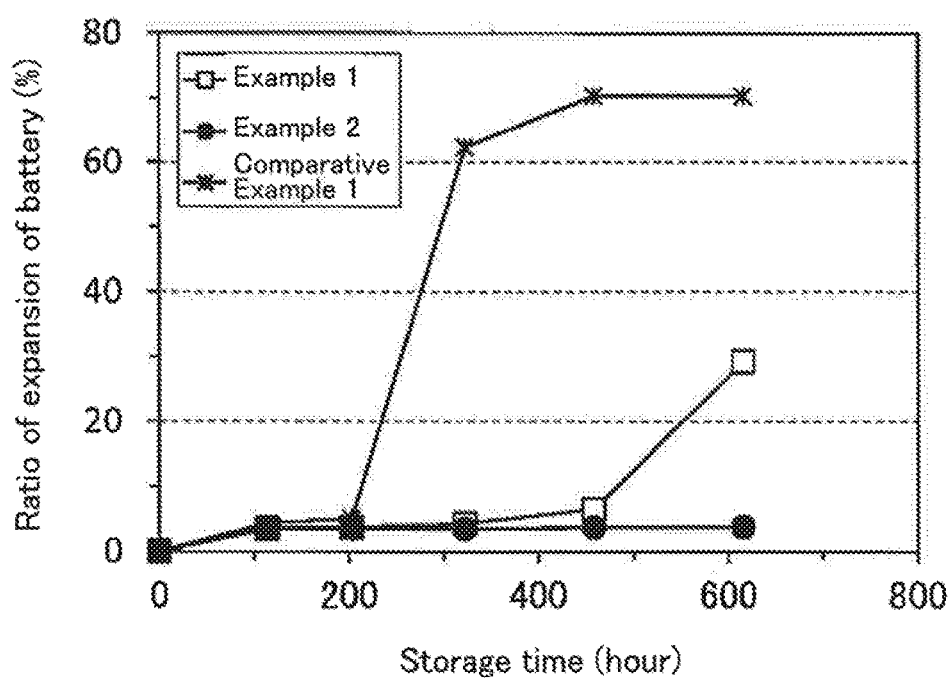
FIG. 2 is a graph showing the results of evaluating the reliability of nonaqueous electrolyte primary batteries of Examples 1, 2 and Comparative Example 1 in a high temperature environment.

Table 1 and FIG. 2 show the results of the evaluation of the reliability in the high temperature environment, and Table 2 shows the results of the evaluation of the properties of the battery after the high temperature storage. FIG. 2 is a graph showing how the ratio of the amount of change to the height immediately after the production of the battery has changed over time. The vertical axis indicates the ratio of expansion of the battery, and the horizontal axis indicates the storage time of the battery.

TABLE 1

| Storage time (hour) | Amount of expansion of battery (mm) | | |
|---|---|---|---|
| | Example 1 | Example 2 | Comparative Example 1 |
| 0 | 0 | 0 | 0 |
| 114 | 0.113 | 0.114 | 0.136 |
| 203 | 0.119 | 0.115 | 0.164 |
| 323 | 0.136 | 0.113 | 1.995 |
| 459 | 0.208 | 0.119 | 2.251 |
| 616 | 0.936 | 0.123 | 2.250 |

TABLE 2

| | Initial | | Depth of discharge of 60% after high temperature storage | |
|---|---|---|---|---|
| | Internal resistance (mΩ) | OCV (V) | Internal resistance (mΩ) | OCV (V) |
| Example 1 | 8 | 3.15 | 25 | 3.03 |
| Example 2 | 8 | 3.20 | 18 | 3.04 |
| Comparative Example 1 | 10 | 3.15 | 236 | 0.05 |

As shown in Table 1 and FIG. 2, in the nonaqueous electrolyte primary batteries of Examples 1 and 2, both of which used the nonaqueous electrolyte solution containing an appropriate amount of $LiB(C_2O_4)_2$, the battery expansion was favorably suppressed even after the storage time elapsed. On the other hand, in the battery of Comparative Example 1, which used the nonaqueous electrolyte solution containing PS instead of $LiB(C_2O_4)_2$, the amount of expansion of the battery was rapidly increased when the storage time exceeded about 203 hours.

As shown in Table 2, the nonaqueous electrolyte primary batteries of Examples 1 and 2, both of which used the nonaqueous electrolyte solution containing an appropriate amount of $LiB(C_2O_4)_2$, were able to suppress a reduction in the properties in a high temperature environment of 120° C., even if the batteries had a depth of discharge of 40% or more, at which the properties of the batteries were likely to be reduced during the high temperature storage.

Example 3

A nonaqueous electrolyte solution was prepared in the same manner as Example 1 except that $LiB(C_2O_4)_2$ was added in an amount of 0.5% by mass. Then, a nonaqueous electrolyte primary battery was produced in the same manner as Example 1 except that this nonaqueous electrolyte solution was used. The proportion of $LiB(C_2O_4)_2$ in the total amount of $LiClO_4$ and $LiB(C_2O_4)_2$ was 6 mol %.

Example 4

A nonaqueous electrolyte solution was prepared in the same manner as Example 1 except that $LiB(C_2O_4)_2$ was added in an amount of 2% by mass. Then, a nonaqueous electrolyte primary battery was produced in the same manner as Example 1 except that this nonaqueous electrolyte solution was used. The proportion of $LiB(C_2O_4)_2$ in the total amount of $LiClO_4$ and $LiB(C_2O_4)_2$ was 18 mol %.

Example 5

A nonaqueous electrolyte solution was prepared in the same manner as Example 1 except that $LiB(C_2O_4)_2$ was added in an amount of 3% by mass. Then, a nonaqueous electrolyte primary battery was produced in the same manner as Example 1 except that this nonaqueous electrolyte solution was used. The proportion of $LiB(C_2O_4)_2$ in the total amount of $LiClO_4$ and $LiB(C_2O_4)_2$ was 25 mol %.

<Evaluation of Discharge Characteristics at Low Temperatures>

The discharge characteristics of the nonaqueous electrolyte primary batteries of Examples 1 and 3 to 5 were evaluated at −10° C. under the following conditions.

The batteries were allowed to stand still and cool in an environment of −10° C. Subsequently, each of the batteries was connected to a resistance of 500Ω and discharged. A closed circuit voltage (CCV) of each of the batteries was measured 5 seconds after the start of the discharge.

Moreover, each of the batteries of Examples 1 and 3 to 5 (different from those used for the above measurement) was connected to a resistance of 15 kΩ and discharged 40% of the design capacity. Thus, the batteries with a depth of discharge of 40% were prepared. Then, the CCV of each of the batteries with a depth of discharge of 40% was measured in an environment of −10° C. in the same manner as described above.

Further, each of the batteries of Examples 1 and 3 to 5 (different from those used for the above measurement) was connected to a resistance of 15 kΩ and discharged 80% of the design capacity. Thus, the batteries with a depth of discharge of 80% were prepared. Then, the CCV of each of the batteries with a depth of discharge of 80% was measured in an environment of −10° C. in the same manner as described above.

Figure 3:
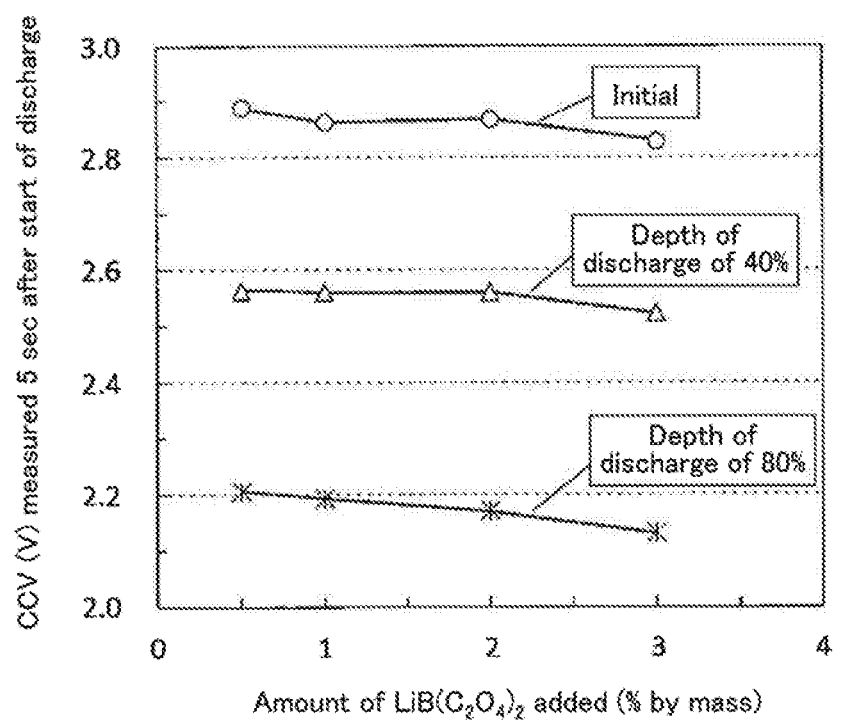
FIG. 3 is a graph showing the results of evaluating the discharge characteristics of nonaqueous electrolyte primary batteries of Examples 1 and 3 to 5 at low temperatures.

Table 3 and FIG. 3 show the results of the evaluation of the discharge characteristics at −10° C. In FIG. 3, the results shown in Table 3 are expressed as a relationship between the amount of $LiB(C_2O_4)_2$ added and the CCV measured 5 seconds after the start of the discharge.

TABLE 3

| Amount of $LiB(C_2O_4)_2$ added to electrolyte solution used in battery (% by mass) | Evaluation of discharge characteristics at low temperatures CCV (V) measured 5 sec after start of discharge | | |
|---|---|---|---|
| | Initial | Depth of discharge of 40% | Depth of discharge of 80% |
| Example 1 | 1 | 2.86 | 2.56 | 2.19 |
| Example 3 | 0.5 | 2.89 | 2.57 | 2.21 |
| Example 4 | 2 | 2.87 | 2.56 | 2.17 |
| Example 5 | 3 | 2.83 | 2.52 | 2.13 |

As shown in Table 3 and FIG. 3, the CCV was reduced with increasing the amount of $LiB(C_2O_4)_2$ added to the electrolyte solution used in the battery, resulting in low discharge characteristics. Therefore, the content of $LiB(C_2O_4)_2$ in the nonaqueous electrolyte solution may be 5% by mass or less, and preferably 3% by mass or less. In particular, if the content is 2% by mass or less, the discharge characteristics are hardly reduced when the depth of discharge is relatively low. Accordingly, the content is more preferably 2% by mass or less.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

INDUSTRIAL APPLICABILITY

The nonaqueous electrolyte primary battery of the present invention has not only good discharge characteristics, but also excellent reliability in a high temperature environment. By making full use of these properties, the nonaqueous electrolyte primary battery may be particularly suitable for the applications where the battery is likely to be exposed to high temperatures such as automotive applications, including the use of the battery as a power source of a pressure sensor located inside a tire. Moreover, the nonaqueous electrolyte primary battery can also be used for the same purposes as the various purposes for which the conventionally known nonaqueous electrolyte batteries (primary batteries or secondary batteries) have been used.

DESCRIPTION OF REFERENCE NUMERALS

1 Nonaqueous electrolyte primary battery
2 Positive electrode

3 Negative electrode
4 Separator
5 Outer can
6 Sealing plate
7 Insulating gasket

The invention claimed is:

1. A nonaqueous electrolyte primary battery comprising:
a negative electrode containing metallic lithium or a lithium alloy;
a positive electrode;
a separator; and
a nonaqueous electrolyte solution,
wherein the nonaqueous electrolyte solution contains at least $LiClO_4$ as an electrolyte and 0.1 to 5% by mass of $LiB(C_2O_4)_2$,
a content of $LiClO_4$ in the nonaqueous electrolyte solution is 0.3 to 0.8 mol/l, and
a proportion of $LiB(C_2O_4)_2$ in a total amount of $LiClO_4$ and $LiB(C_2O_4)_2$ in the nonaqueous electrolyte solution is 3 to 25 mol %.

2. The nonaqueous electrolyte primary battery according to claim 1, wherein a proportion of $LiB(C_2O_4)_2$ in a total amount of $LiClO_4$ and $LiB(C_2O_4)_2$ in the nonaqueous electrolyte solution is 5 to 20 mol %.

3. The nonaqueous electrolyte primary battery according to claim 1, wherein the negative electrode contains a lithium layer and the lithium alloy formed on the surface of the lithium layer.

4. The nonaqueous electrolyte primary battery according to claim 1, wherein the nonaqueous electrolyte solution contains propylene carbonate and ether at a volume ratio of 30:70 to 70:30 as a solvent of the nonaqueous electrolyte solution.

5. The nonaqueous electrolyte primary battery according to claim 1, wherein, the positive electrode contains manganese dioxide.

6. A method for producing a nonaqueous electrolyte primary battery comprising:
placing a negative electrode containing metallic lithium or a lithium alloy, a positive electrode, a separator, and a nonaqueous electrolyte solution inside an outer package,
wherein the nonaqueous electrolyte solution contains at least $LiClO_4$ as an electrolyte and 0.1 to 5% by mass of $LiB(C_2O_4)_2$,
a content of $LiClO_4$ in the nonaqueous electrolyte solution is 0.3 to 0.8 mol/l, and
a proportion of $LiB(C_2O_4)_2$ in a total amount of $LiClO_4$ and $LiB(C_2O_4)_2$ in the nonaqueous electrolyte solution is 3 to 25 mol %.

7. The method according to claim 6, wherein a proportion of $LiB(C_2O_4)_2$ in a total amount of $LiClO_4$ and $LiB(C_2O_4)_2$ in the nonaqueous electrolyte solution is 5 to 20 mol %.

8. The method according to claim 6, wherein the negative electrode is formed by bringing a laminated body into contact with the nonaqueous electrolyte solution, the laminated body having a lithium layer and a layer that contains an alloying element for forming a lithium alloy and that is directly disposed on the surface of the lithium layer.

* * * * *